United States Patent
Desai

(10) Patent No.: US 9,751,032 B2
(45) Date of Patent: Sep. 5, 2017

(54) DUPLEX STRAINER APPARATUSES, SYSTEMS AND METHODS

(75) Inventor: Ashvin D. Desai, Lumberton, NC (US)

(73) Assignee: TITAN FLOW CONTROL, INC, Lumberton, NC (US)

( * ) Notice: Subject to any disclaimer, the term of this patent is extended or adjusted under 35 U.S.C. 154(b) by 404 days.

(21) Appl. No.: 13/175,351

(22) Filed: Jul. 1, 2011

(65) Prior Publication Data

US 2012/0006763 A1 Jan. 12, 2012

Related U.S. Application Data

(60) Provisional application No. 61/360,620, filed on Jul. 1, 2010.

(51) Int. Cl.
*B01D 35/12* (2006.01)
*F16K 11/02* (2006.01)

(52) U.S. Cl.
CPC .............. *B01D 35/12* (2013.01); *F16K 11/02* (2013.01); *B01D 2201/165* (2013.01)

(58) Field of Classification Search
CPC ........ B01D 2201/165; B01D 2201/301; B01D 2201/302; B01D 2201/303; B01D 2201/304; B01D 25/00; B01D 25/02; B01D 35/12; B01D 35/30; F16K 11/02; F16K 11/044; F16K 11/06; F16K 11/074
USPC ..... 137/255, 262, 545, 549, 599.01, 601.01, 137/607, 625, 625.17, 625.28, 65.31, 867; 210/137, 232, 323.1, 340, 341, 347, 420, 210/424, 450, 545, 767, 806
See application file for complete search history.

(56) References Cited

U.S. PATENT DOCUMENTS

| 678,001 | A | | 7/1901 | Merrill | |
|---|---|---|---|---|---|
| 1,400,424 | A | * | 12/1921 | Derby | ..................... F16K 11/16 137/599.14 |
| 1,408,822 | A | * | 3/1922 | Mosher | ......................... 210/341 |

(Continued)

FOREIGN PATENT DOCUMENTS

| CA | 1214115 | 11/1986 |
|---|---|---|
| CA | 2745673 | 4/2015 |

(Continued)

OTHER PUBLICATIONS

Rosedale Products, Inc., Duplex Model 4 Installation, Operation and Maintenance Manual, 2003, 6 pages.*

(Continued)

*Primary Examiner* — Patrick Orme
(74) *Attorney, Agent, or Firm* — Jenkins, Wilson, Taylor & Hunt, P.A.

(57) ABSTRACT

Duplex fluid strainers, systems and methods are provided, and include a housing with a first valve chamber defining an inlet port, a first port, and a second port, and a second valve chamber defining a third port, a fourth port, and an outlet port. The first and third ports communicate with a first strainer chamber, and the second and fourth ports communicate with a second strainer. A first seal assembly includes a first disk movable within the first valve chamber into sealing engagement against either of the first port or the second port, and a second seal assembly includes a second disk movable within the second valve chamber into sealing engagement against either of the third port or the fourth port.

23 Claims, 4 Drawing Sheets

(56) References Cited

U.S. PATENT DOCUMENTS

| | | | |
|---|---|---|---|
| 1,919,031 A * | 7/1933 | Muhleisen | B01D 35/12 137/599.14 |
| 2,681,736 A * | 6/1954 | Voorheis | 210/341 |
| 2,847,028 A * | 8/1958 | Ross | 137/867 |
| 4,496,463 A * | 1/1985 | Desai et al. | 210/341 |
| 4,496,493 A | 1/1985 | Hodakowski | |
| 7,172,706 B2 * | 2/2007 | Ross et al. | 210/788 |
| RE40,721 E | 6/2009 | Desai | |

FOREIGN PATENT DOCUMENTS

| | | |
|---|---|---|
| CN | 2894790 | 5/2007 |
| CN | 101745264 | 6/2010 |
| CN | 102 327 713 B | 8/2015 |

OTHER PUBLICATIONS

Email communication (Nov. 12, 2014), 23 pages.*
Collins English Dictionary Definition of "vane" (accessed Jun. 11, 2016 at http://www.collinsdictionary.com/dictionary/english/vane), 1 pages.*
Canadian Office Action for Application No. 2 745 673 dated Jul. 17, 2013.
Chinese Office Action and Search Report for Application No. 2011101967352 dated Apr. 29, 2014.
Canadian Notice of Allowance for Application No. 2,745,673 dated Aug. 1, 2014.
Chinese Notice of Granting Patent Right for Invention for Application No. 201110196735.2 dated May 19, 2015.
Chinese Notice of Publication and Grant for Application No. 12104532 dated Apr. 29, 2016.

* cited by examiner

DUPLEX STRAINER APPARATUSES, SYSTEMS AND METHODS

RELATED APPLICATIONS

The presently disclosed subject matter claims the benefit of U.S. Patent Application Ser. No. 61/360,620, filed Jul. 1, 2010, the disclosure of which is incorporated herein by reference in its entirety.

TECHNICAL FIELD

The subject matter disclosed herein relates generally to a fluid strainer for use in a fluid piping system. More particularly, the subject matter disclosed herein relates to duplex strainer apparatuses, systems and methods for providing multiple straining flow paths.

BACKGROUND

In many fluid flow applications, it is often necessary that the flow from an upstream source be cleaned or strained before use in downstream components. In this regard, strainers are used to protect such downstream equipment by mechanically removing solids from flowing fluids via a straining element, such as a perforated, mesh, or wedge-wire straining element. Although many designs and configurations of strainers exist, duplex strainers provide an added advantage over other straining systems by permitting continuous straining and cleaning of a flow. Specifically, duplex strainers generally include two strainer chambers and some type of mechanism for diverting the flow from one chamber to the other to isolate the flow to a single chamber. This arrangement permits cleaning, servicing, or repairing of one chamber while the other one is in use, thereby enabling the flow through the duplex strainer to remain substantially continuous.

A number of different designs for duplex strainers have been used, with varying valve designs (e.g., scotch yokes, ball valves) for switching the flow between strainers, but each design both has advantages over other options and suffers from one or more problems, such as number and complexity of components, space requirements, effectiveness in flow isolation, and/or ease of operation. Accordingly, an improved duplex strainer is desirable, for example one with a design to effectively control the flow between and among multiple strainer assemblies while minimizing the problems found in prior art designs.

SUMMARY

In accordance with this disclosure, novel apparatuses, systems and methods are provided for fluid straining for use in a fluid piping system. In one aspect, a fluid strainer is provided. The fluid strainer can comprise a housing comprising a first valve chamber comprising an inlet port, a first port, and a second port, and a second valve chamber comprising a third port, a fourth port, and an outlet port. A first strainer chamber can comprise a first strainer inlet in communication with the first port and a first strainer outlet in communication with the third port, and a second strainer chamber can comprise a second strainer inlet in communication with the second port and a second strainer outlet in communication with the fourth port. Within the first valve chamber, a first seal assembly can comprise a first pivotable member, a first disk, and a first coupler connecting the first pivotable member to the first disk such that the first pivotable member is movable to cause the first disk to move within the first valve chamber into sealing engagement against either of the first port or the second port. Similarly, within the second valve chamber, a second seal assembly can comprise a second pivotable member, a second disk, and a second coupler connecting the second pivotable member to the second disk such that the second pivotable member is movable to cause the second disk to move within the second valve chamber into sealing engagement against either of the third port or the fourth port.

Although an aspect of the subject matter disclosed herein has been stated hereinabove, and which is achieved in whole or in part by the presently disclosed subject matter, other aspects will become evident as the description proceeds when taken in connection with the accompanying drawings as best described hereinbelow.

BRIEF DESCRIPTION OF THE DRAWINGS

The features and advantages of the present subject matter will be more readily understood from the following detailed description which should be read in conjunction with the accompanying drawings that are given merely by way of explanatory and non-limiting example, and in which.

DETAILED DESCRIPTION

Figure 1:
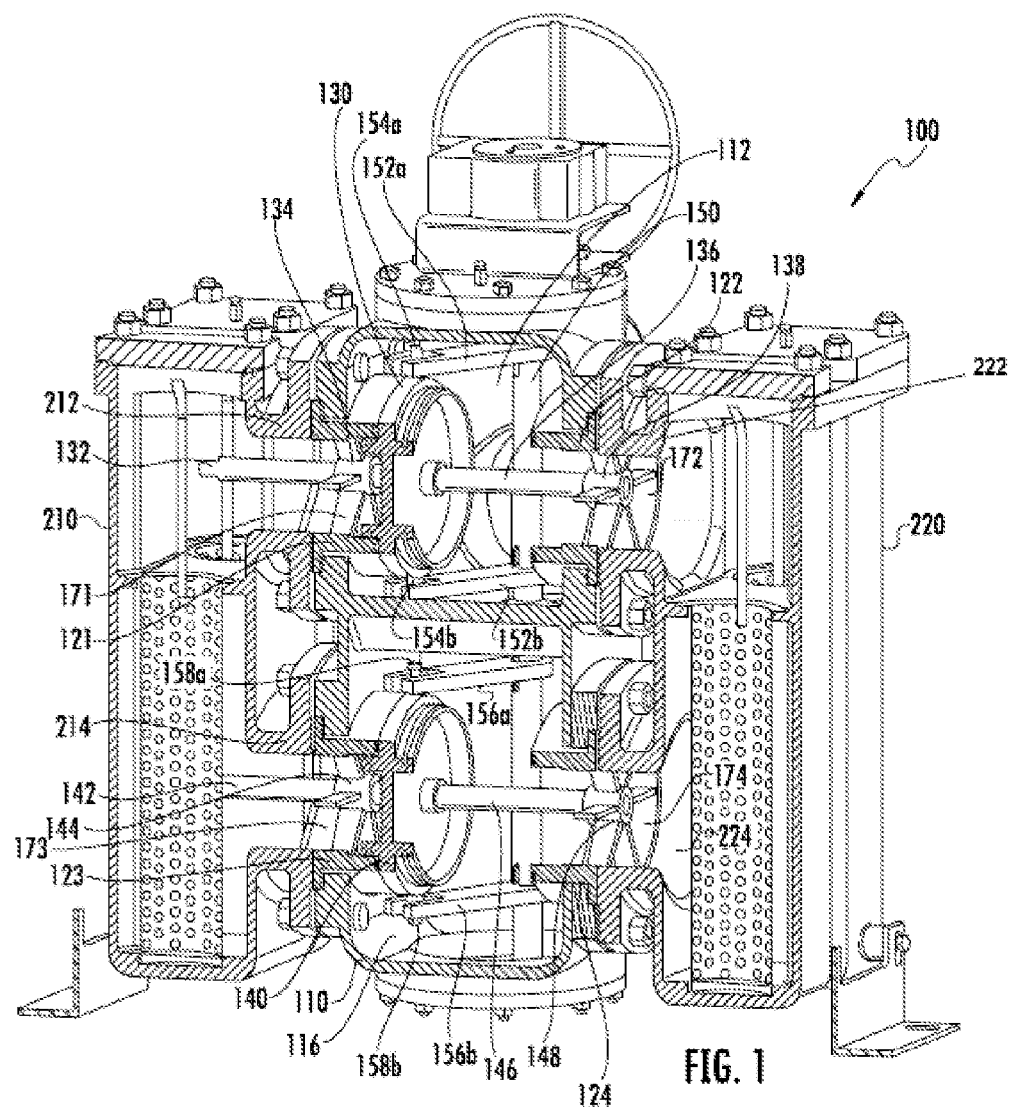
FIG. 1 is a perspective cutaway view of a duplex fluid strainer according to an embodiment of the presently disclosed subject matter.
Figure 2:
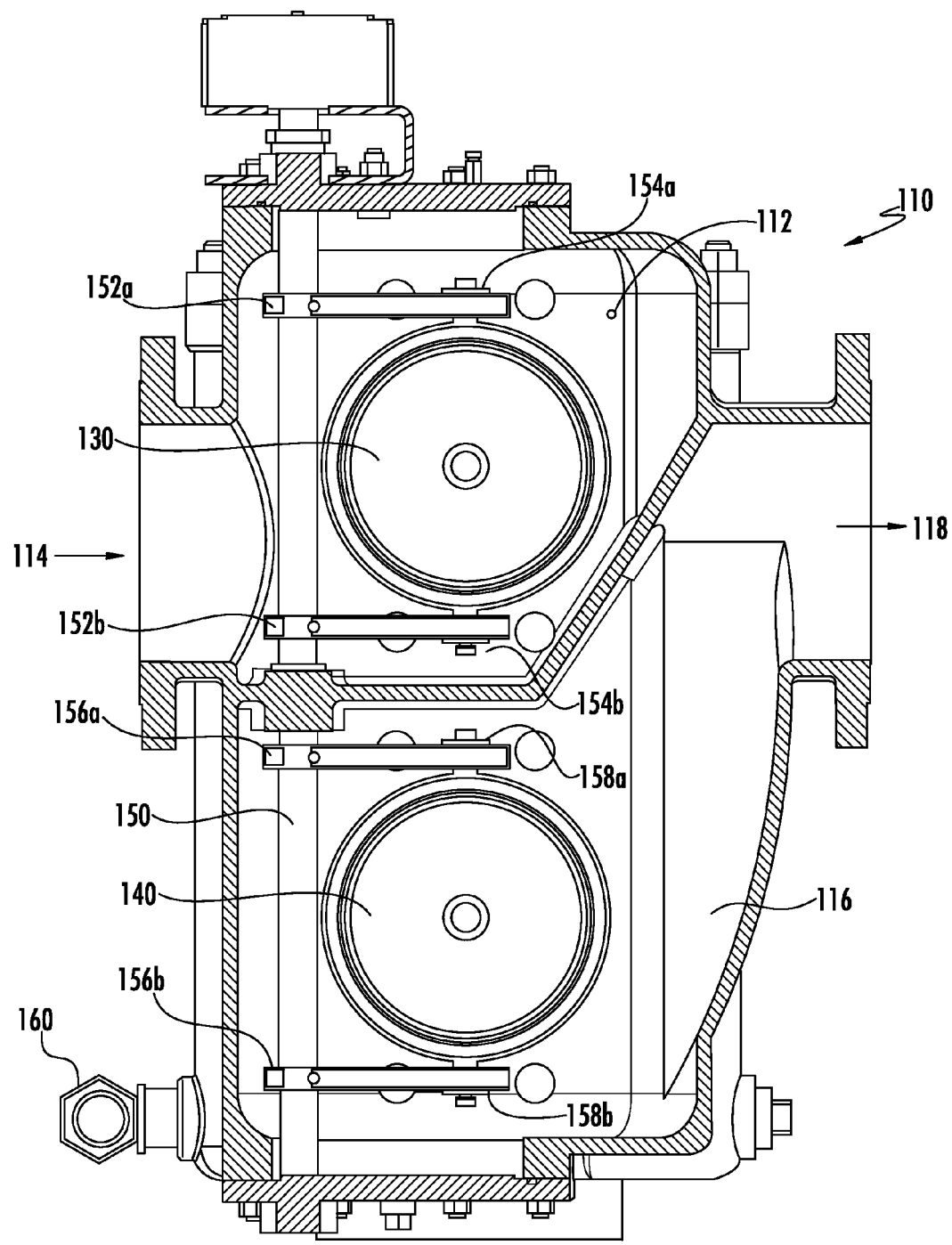
FIG. 2 is a side sectional view of a housing of a duplex fluid strainer according to an embodiment of the presently disclosed subject matter.

The present subject matter provides devices for fluid straining for use in a fluid piping system. In one aspect, the present subject matter provides a fluid strainer, generally designated 100. As shown in FIGS. 1 and 2, fluid strainer 100 can comprise a housing 110, which can itself comprise a first valve chamber 112 defining a strainer inlet 114 and a second valve chamber 116 defining a strainer outlet 118. Fluid strainer 100 can be installed in-line with a fluid piping system such that fluid is received from an upstream piping element at strainer inlet 114 and passed to a downstream piping element out of strainer outlet 118.

In addition, strainer 100 can further include a first strainer chamber 210 and a second strainer chamber 220, each in communication with both of first valve chamber 112 and second valve chamber 116, and each containing a removable strainer basket or filter therein for straining and cleaning the material which flows therethrough. Each of housing 110, first strainer chamber 210, and second strainer chamber 220 can be composed of a cast iron material, stainless steel, bronze, or any other material determined to be appropriate for the particular fluid piping system. First strainer chamber 210 and second strainer chamber 220 can each be secured to housing 110 using any of a variety of fasteners, including but not limited to studs, bolts, or clamps. One or both of first strainer chamber 210 or second strainer chamber 220 can be detachable from housing 110, which can allow easy access for cleaning, repair, or any other maintenance procedure.

In this configuration, fluid received by first valve chamber 112 through strainer inlet 114 can be passed to either or both of first strainer chamber 210 or second strainer chamber 220, entrained solids or other undesirable materials can be removed from the fluid within first or second strainer chambers 210 or 220, the fluid can be passed from the strainer chambers to second valve chamber 116, and the fluid can be discharged from second valve chamber 116 through strainer outlet 118.

In particular, in addition to strainer inlet 114, first valve chamber 112 can further define a first port 121 and a second port 122. In the configuration shown in FIG. 1, for example, first port 121 and second port 122 can be positioned on opposite sides of first valve chamber 112. Each of first port 121 and second port 122 can serve as fluid pathways out of first valve chamber 112 (e.g., toward first strainer chamber 210 or second strainer chamber 220, respectively). For instance, first strainer chamber 210 can comprise a first strainer inlet 212 in communication with first port 121, whereas second strainer chamber 220 can comprise a second strainer inlet 222 in communication with second port 122. In this arrangement, fluid received by first valve chamber 112 through strainer inlet 114 can be directed through either or both of first port 121 or second port 122 for directing fluid to one or both of first or second strainer chambers 210 or 220, respectively.

Likewise, second valve chamber 116 can define a third port 123 and a fourth port 124, which can be positioned on opposing sides of second valve chamber 116 and can each serve to admit fluid into second valve chamber 116 (e.g., from first strainer chamber 210 or second strainer chamber 220, respectively). For instance, first strainer chamber 210 can comprise a first strainer outlet 214 in communication with third port 123, and second strainer chamber 220 can comprise a second strainer outlet 224 in communication with fourth port 124. In this arrangement, fluid from either or both of first or second strainer chambers 210 or 220 can be directed to second valve chamber 116 through third and fourth ports 123 or 124, respectively, for directing fluid to second valve chamber 116 and out of fluid strainer 100 through strainer outlet 118.

Regarding the particular design of fluid strainer 100, FIG. 1 shows a cutaway front view of fluid strainer 100. As shown in FIG. 1, fluid strainer 100 can comprise a movable flow control system within housing 110 to selectively control the flow of fluid to either or both of first or second strainer chambers 210 or 220. Specifically, for example, the flow control system can comprise a first disk 130 movable within first valve chamber 112 into sealing engagement against either of first port 121 or second port 122. First disk 130 can be sufficiently sized so that it is capable of closing off flow when moved against either of first port 121 or second port 122. In this regard, first disk 130 can include sealing elements, such as O-rings formed from an elastomeric material (e.g., rubber), which can help first disk 130 to form a fluid-tight seal with first port 121 or second port 122.

To help guide the movement of first disk 130 within first valve chamber 112, first disk 130 can be connected to a first disk stem 132 that extends away from one side of first disk 130 towards first port 121. First disk stem 132 can be received by a first disk guide 134 positioned within first port 121. Similarly, first disk 130 can be further connected to a second disk stem 136 that extends away from the other side of first disk 130 towards second port 122. Second disk stem 136 can be received by a second disk guide 138 positioned within second port 122. In this arrangement, first disk 130 can be slideably supported for reciprocal lateral movement in first valve chamber 112.

Similarly, a second disk 140 can be movable within second valve chamber 116 into sealing engagement against either of third port 123 or fourth port 124. Again, second disk 140 can be sized to substantially block flow to either of third port 123 or fourth port 124, and second disk 140 can further include sealing elements (e.g., O-rings) for helping to establish a fluid-tight seal. Second disk 140 can be connected to a third disk stem 142 and a fourth disk stem 146 extending away from opposing sides of second disk 140 towards a third disk guide 144 positioned in third port 123 and a fourth disk guide 148 positioned in fourth port 124, respectively. In this arrangement, second disk 140 can be slideably supported for reciprocal lateral movement in second valve chamber 116.

Movement of first disk 130 and second disk 140 can be controlled by a single pivotable coupling rod 150 that can, for example and without limitation, extend through both of first valve chamber 112 and second valve chamber 116. Specifically, within first valve chamber 112, at least one first coupler can be mounted to coupling rod 150 and can extend toward first disk 130. In the configuration shown in FIGS. 1, 2, 3A, and 3B, for example, the at least one first coupler can comprise a top first coupler 152a and a bottom first coupler 152b, which can each comprise a Scotch yoke extending from coupling rod 150 towards an exterior edge of first disk 130. Referring to FIG. 2, top first coupler 152a can extend from coupling rod 150 towards a first pin 154a connected at a top edge of first disk 130, and bottom first coupler 152b can extend from coupling rod 150 towards a second pin 154b connected at a bottom edge of first disk 130. Each of top first coupler 152a and bottom first coupler 152b can define a substantially forked end that is adapted to capture first pin 154a and second pin 154b, respectively.

Likewise, within second valve chamber 116, at least one second coupler can be mounted to coupling rod 150 and can extend toward second disk 140. For example, the at least one second coupler can comprise a top second coupler 156a and a bottom first coupler 156b, which can each comprise a Scotch yoke extending from coupling rod 150 towards second disk 140. Specifically, top second coupler 156a can extend towards a third pin 158a connected at a top edge of second disk 140, and bottom second coupler 156b can extend from coupling rod 150 towards a fourth pin 158b connected at a bottom edge of second disk 140.

Figure 3A:
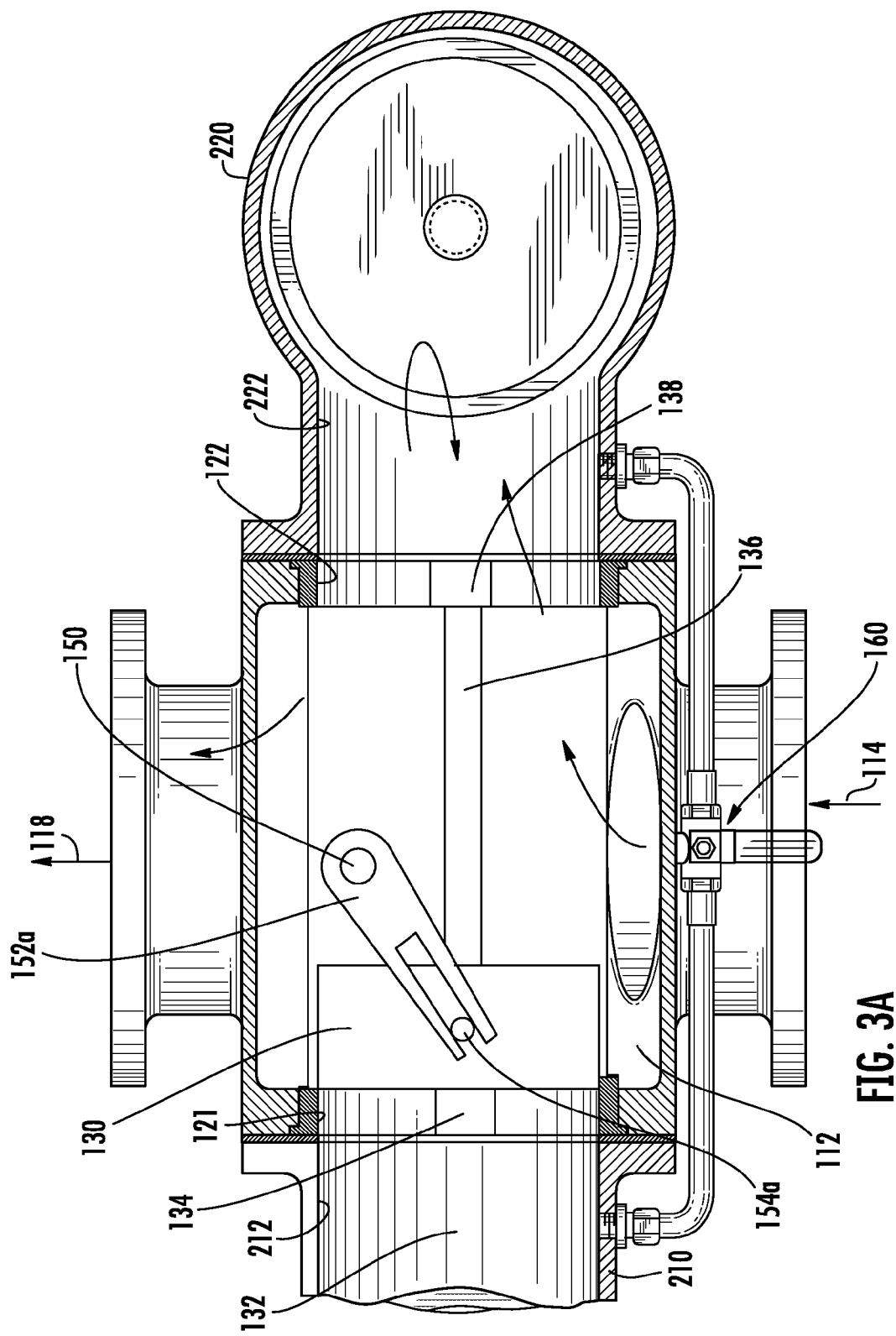
FIGS. 3A and 3B are top sectional views of a duplex fluid strainer according to two embodiments of the presently disclosed subject matter.
Figure 3B:
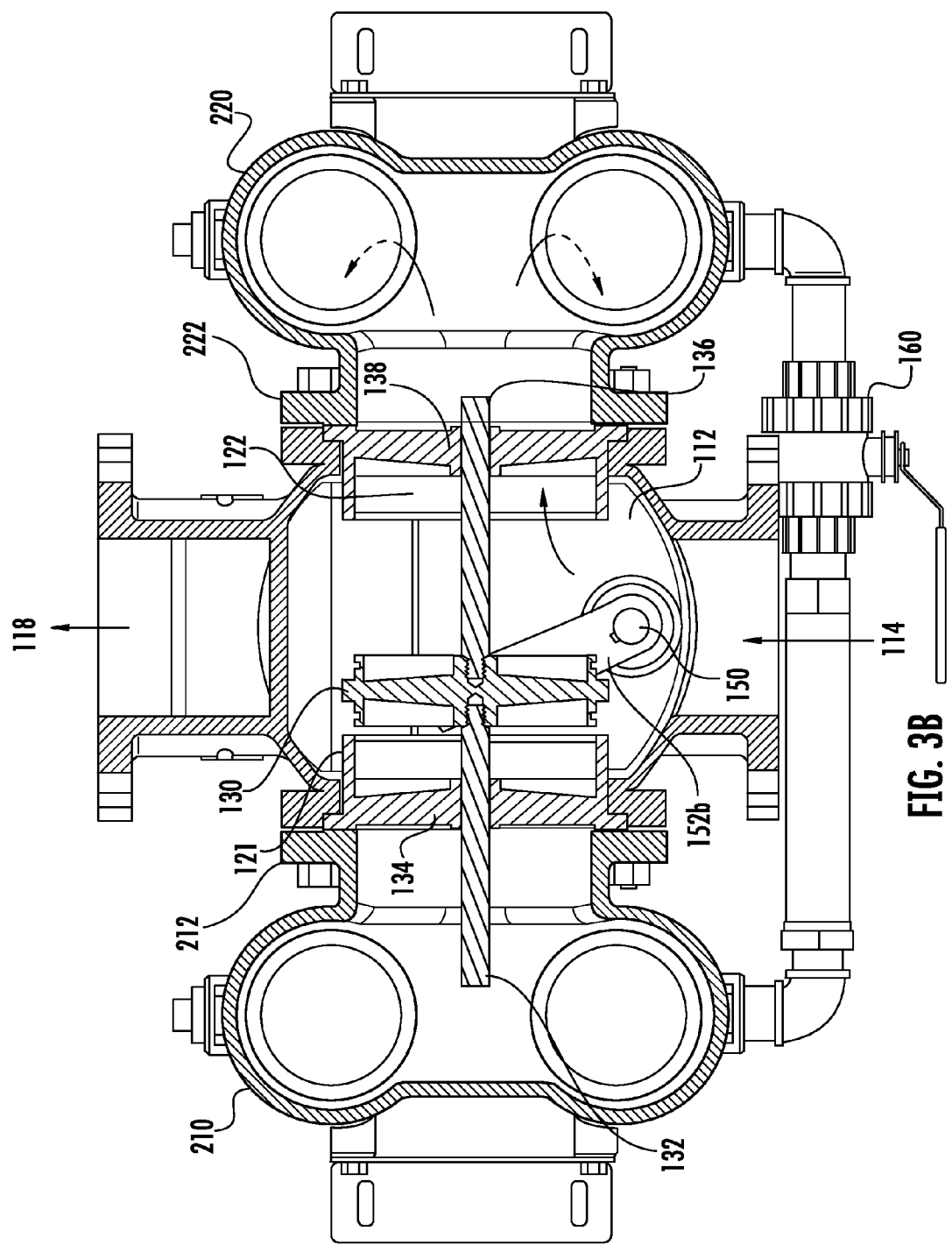

In this arrangement, when coupling rod 150 is rotated, the rotation can be transferred by first couplers 152a and 152b and second couplers 156a and 156b into linear sliding displacement of both first disk 130 and second disk 140. For example, coupling rod 150 can be rotated to a first sealing position in which first disk 130 is moved into sealing engagement against first port 121 of first strainer chamber 112, and second disk 140 is moved into sealing engagement against third port 123 of second strainer chamber 116. This arrangement is shown generally in FIG. 3A. As shown in FIG. 3A, in this first sealing position, fluid entering first valve chamber 112 through strainer inlet 114 can be routed through second port 122 into second strainer chamber 220, from which it can be further routed through fourth port 124 into second valve chamber 116, where it can be discharged from strainer outlet 118. Similarly, FIG. 3B shows first disk 130 moving towards this position in a version of fluid strainer 100 having two strainer baskets in each of first strainer chamber 210 and second strainer chamber 220. Regardless of the specific configuration of fluid strainer 100, however, the movement of first disk 130 and second disk 140 can be substantially the same.

Alternatively, coupling rod 150 can be rotated to move to a second sealing position in which first disk 130 is in sealing engagement against second port 122 at the same time that second disk 140 is in sealing engagement against fourth port 124. In this arrangement, fluid entering first valve chamber 112 through strainer inlet 114 can be routed through first port 121, first strainer chamber 210, and third port 123 into second valve chamber 116, where it can be discharged from strainer outlet 118.

Finally, a number of additional features can further improve the operation of fluid strainer 100. First, a pressure equalization line generally designated 160 can be connected between first strainer chamber 210 and second strainer chamber 220 for improving service life of seals within fluid strainer 100 and minimizing operating torque. Specifically, for instance, when coupling rod 150 is moved to the first sealing position (i.e., positioned for flow through second strainer chamber 220), fluid pressure in the system can tend to maintain first disk 130 and second disk 140 against first port 121 and third port 123, respectively, making it difficult to move coupling rod 150 to the first sealing position or to a neutral position in between the first and second sealing positions. To alleviate this problem, pressure equalization line 160 can be operated to reduce or eliminate the pressure differential between the active fluid pathway (e.g., first valve chamber 112, second strainer chamber 220, and second valve chamber 116) and first strainer chamber 210, thereby requiring less force to operate coupling rod 150.

Another feature that can be advantageously included in fluid strainer 100 is a flow-smoothing mechanism to reduce turbulence within the fluid pathways of fluid strainer 100. Specifically, fluid strainer 100 can comprise a plurality of flow routing vanes at least partially traversing one or more of first port 121, second port 122, third port 123, or fourth port 124. For example, referring again to FIG. 1, first port 121 can comprise a plurality of first flow routing vanes 171 positioned across the opening. First flow routing vanes 171 can be configured to alter incoming turbulent flow between first valve chamber 112 and first strainer chamber 210 to become smoother, thereby reducing pressure drop, noise, erosion, corrosion, vibration, and/or cavitations. Similarly, as shown in FIG. 1, one or more of second port 122, third port 123, and/or fourth port 124 can likewise comprise a plurality of second flow routing vanes 172, third flow routing vanes 173, and/or fourth flow routing vanes 174, respectively, for smoothing the flow through those ports.

The present subject matter can be embodied in other forms without departure from the spirit and essential characteristics thereof. The embodiments described therefore are to be considered in all respects as illustrative and not restrictive. Although the present subject matter has been described in terms of certain preferred embodiments, other embodiments that are apparent to those of ordinary skill in the art are also within the scope of the present subject matter.

What is claimed is:

1. A fluid strainer comprising:
   a housing comprising a first valve chamber comprising an inlet port, a first port, and a second port, and a second valve chamber comprising a third port, a fourth port, and an outlet port, wherein the first valve chamber is separated from the second valve chamber by an inner wall comprising two distinct portions, a first portion being substantially planar and a second portion being inclined relative to the first portion;
   a first strainer chamber comprising a first strainer inlet in communication with the first port and a first strainer outlet in communication with the third port;
   a second strainer chamber comprising a second strainer inlet in communication with the second port and a second strainer outlet in communication with the fourth port;
   a first seal assembly comprising a first pivotable member, a first disk comprising a first disk stem extending from a first side of the first disk to the first port and a second disk stem extending from an opposing second side of the first disk to the second port, a first disk guide fixedly positioned within the first port and a second disk guide fixedly positioned within the second port, and a first coupler extending from the first pivotable member towards an exterior edge of the first disk and connecting the first pivotable member to the first disk, wherein the first pivotable member is movable to cause the first disk to move within the first valve chamber into sealing engagement against either of the first port or the second port, wherein the first disk stem is linearly translatable through the first disk guide and into at least the first strainer inlet when the first disk is moved into sealing engagement against the first port, and wherein the second disk stem is linearly translatable through the second disk guide and into at least the second strainer inlet when the first disk is moved into sealing engagement against the second port; and
   a second seal assembly comprising a second pivotable member, a second disk comprising a third disk stem extending from a first side of the second disk to the third port and a fourth disk stem extending from an opposing second side of the second disk to the fourth port, a third disk guide fixedly positioned within the third port and a fourth disk guide fixedly positioned within the fourth port, and a second coupler extending from the second pivotable member towards an exterior edge of the second disk and connecting the second pivotable member to the second disk, wherein the second pivotable member is movable to cause the second disk to move within the second valve chamber into sealing engagement against either of the third port or the fourth port, wherein the third disk stem is linearly translatable through the third disk guide and into at least the first strainer outlet when the second disk is moved into sealing engagement against the third port, and wherein the fourth disk stem is linearly translatable through the fourth disk guide and into at least the second strainer outlet when the second disk is moved into sealing engagement against the fourth port;
   wherein the first disk guide is fixedly positioned at a center of the first port, and a plurality of flow routing vanes extend from the first disk guide to an edge of the first port,
   wherein the second disk guide is fixedly positioned at a center of the second port, and a plurality of flow routing vanes extend from the second disk guide to an edge of the second port,
   wherein the third disk guide is fixedly positioned at a center of the third port, and a plurality of flow routing vanes extend from the third disk guide to an edge of the third port,
   wherein the fourth disk guide is fixedly positioned at a center of the fourth port, and a plurality of flow routing vanes extend from the fourth disk guide to an edge of the fourth port, and
   wherein the plurality of flow routing vanes each comprise a planar surface with a first end and a second end, the planar surface being oriented so as to be substantially parallel to a flow direction of the fluid, and the first end of each of the flow routing vanes axially extending from a respective disk guide to an edge of a respective port at the second end.

2. The fluid strainer of claim 1, wherein one or both of the first or second strainer chambers is detachable from the housing.

3. The fluid strainer of claim 1, wherein one or both of the first or second strainer chambers comprises a basket access opening, the basket access opening being configured to engage a bolted cover for sealing the basket access opening.

4. The fluid strainer of claim 1, wherein one or both of the first or second strainer chambers comprises field adjustable floor mounting legs.

5. The fluid strainer of claim 1, wherein one or both of the first coupler or the second coupler comprises a scotch yoke.

6. The fluid strainer of claim 1, wherein the first disk stem extends from the first disk to the first disk guide and the second disk stem extends from the first disk to the second disk guide, whereby movement of the first disk into sealing engagement against either of the first port or the second port is constrained by the first disk guide and the second disk guide to be in a predetermined path.

7. The fluid strainer of claim 6, wherein the predetermined path of the first disk is a substantially linear path.

8. The fluid strainer of claim 1, wherein the third disk stem extends from the second disk to the third disk guide and the fourth disk stem extends from the second disk to the fourth disk guide, whereby movement of the second disk into sealing engagement against either of the third port or the fourth port is constrained by the third disk guide and the fourth disk guide to be in a predetermined path.

9. The fluid strainer of claim 8, wherein the predetermined path of the second disk is a substantially linear path.

10. The fluid strainer of claim 1, wherein the first pivotable member and the second pivotable member are coupled such that the first seal assembly and the second seal assembly are movable in unison.

11. The fluid strainer of claim 1, wherein the plurality of flow routing vanes at least partially traverse one or more of an inlet or an outlet and are configured to alter incoming turbulent flow to become smoother, thereby reducing pressure drop, noise, erosion, corrosion, vibration, and/or cavitations.

12. The fluid strainer of claim 1, wherein the first coupler comprises a top first coupler and a bottom first coupler, each of the top first coupler and the bottom first coupler extending from the first pivotable member towards the exterior edge of the first disk, and wherein the second coupler comprises a top second coupler and a bottom second coupler, each of the top second coupler and the bottom second coupler extending from the second pivotable member towards the exterior edge of the second disk.

13. The fluid strainer of claim 12, wherein the top first coupler connectably extends from the first pivotable member towards a first pin connected at a top edge of the first disk and the bottom first coupler connectably extends from the first pivotable member towards a second pin connected at a bottom edge of the first disk, and wherein the top second coupler connectably extends from the second pivotable member towards a third pin connected at a top edge of the second disk and the bottom second coupler connectably extends from the second pivotable member towards a fourth pin connected at a bottom edge of the second disk.

14. A method of straining a fluid using a fluid strainer, the method comprising:
supplying fluid to a first valve chamber of a strainer housing, the first valve chamber comprising a first port and a first strainer inlet in communication with a first strainer chamber and a second port and a second strainer inlet in communication with a second strainer chamber;
linearly translating a first disk stem through a first disk guide and into at least the first strainer inlet or linearly translating a second disk stem through a second disk guide and into at least the second strainer inlet in order to position a first disk of a first seal assembly in sealing engagement against either the first port or the second port, thereby blocking access to the first strainer chamber or the second strainer chamber, respectively, wherein the first seal assembly comprises the first disk, including the first disk stem extending from a first side of the first disk to the first port and the second disk stem extending from an opposing second side of the first disk to the second port, the first disk guide being fixedly positioned within the first port and the second disk guide being fixedly positioned within the second port, a first pivotable member, and a first coupler extending from the first pivotable member towards an exterior edge of the first disk;
positioning the first disk of the first seal assembly in sealing engagement against either of the first port or the second port;
directing the fluid from the first valve chamber to one of the first strainer chamber or the second strainer chamber that is not blocked by the first disk;
directing the fluid from the first strainer chamber or the second strainer chamber to a second valve chamber of the housing; and
directing the fluid out of the second valve chamber;
wherein the first valve chamber is separated from the second valve chamber by an inner wall comprising two distinct portions, a first portion being substantially planar and a second portion being inclined relative to the first portion; and
wherein the first disk guide is fixedly positioned at a center of the first port, and a plurality of flow routing vanes extend from the first disk guide to an edge of the first port, and the second disk guide is fixedly positioned at a center of the second port,
wherein a plurality of flow routing vanes extend from the second disk guide to an edge of the second port, and
wherein the plurality of flow routing vanes each comprise a planar surface with a first end and a second end, the planar surface being oriented so as to be substantially parallel to a flow direction of the fluid, and the first end of each of the flow routing vanes axially extending from a respective disk guide to an edge of a respective port at the second end.

15. The method of claim 14, wherein the second valve chamber comprises a third port and a first strainer outlet in communication with the first strainer chamber and a fourth port and a second strainer outlet in communication with the second strainer chamber;
wherein the method comprises linearly translating a third disk stem through a third disk guide and into at least the first strainer outlet or linearly translating a fourth disk stem through a fourth disk guide and into at least the second strainer outlet in order to position a second disk of a second seal assembly in sealing engagement against either the third port or the fourth port, thereby blocking access to the first strainer chamber or the second strainer chamber, respectively,
wherein the second seal assembly comprises the second disk, including the third disk stem extending from a first side of the second disk to the third port and the fourth disk stem extending from an opposing second side of the second disk to the fourth port, the third disk guide being fixedly positioned within the third port and the fourth disk guide being fixedly positioned within the fourth port, a second pivotable member, and a second coupler extending from the second pivotable member towards an exterior edge of the second disk;

wherein the method comprises positioning the second disk of the second seal assembly in sealing engagement against either of the third port or the fourth port; and wherein the third disk guide is fixedly positioned at a center of the third port, and a plurality of flow routing vanes extend from the third disk guide to an edge of the third port, and wherein the fourth disk guide is fixedly positioned at a center of the fourth port, and a plurality of flow routing vanes extend from the fourth disk guide to an edge of the fourth port.

16. The method of claim 15, wherein the first seal assembly and the second seal assembly are coupled for movement together such that positioning the first disk in sealing engagement against the first port or the second port is coordinated with positioning the second disk assembly in sealing engagement against the third port or the fourth port, respectively.

17. The method of claim 15, wherein the second coupler comprises a top second coupler and a bottom second coupler, each of the top second coupler and the bottom second coupler extending from the second pivotable member towards the exterior edge of the second disk.

18. The method of claim 17, wherein the top second coupler connectably extends from the second pivotable member towards a third pin connected at a top edge of the second disk and the bottom second coupler connectably extends from the second pivotable member towards a fourth pin connected at a bottom edge of the second disk.

19. The method of claim 14, wherein the first coupler comprises a top first coupler and a bottom first coupler, each of the top first coupler and the bottom first coupler extending from the first pivotable member towards the exterior edge of the first disk.

20. The method of claim 19, wherein the top first coupler connectably extends from the first pivotable member towards a first pin connected at a top edge of the first disk and the bottom first coupler connectably extends from the first pivotable member towards a second pin connected at a bottom edge of the first disk.

21. A fluid piping system including a fluid strainer, the fluid strainer comprising:

a housing comprising a first valve chamber comprising an inlet port in communication with an upstream piping element, a first port, and a second port, and a second valve chamber comprising a third port, a fourth port, and an outlet port in communication with a downstream piping element, wherein the first valve chamber is separated from the second valve chamber by an inner wall comprising two distinct portions, a first portion being substantially planar and a second portion being inclined relative to the first portion;

a first strainer chamber comprising a first strainer inlet in communication with the first port and a first strainer outlet in communication with the third port;

a second strainer chamber comprising a second strainer inlet in communication with the second port and a second strainer outlet in communication with the fourth port;

a first seal assembly comprising a first pivotable member, a first disk comprising a first disk stem extending from a first side of the first disk to the first port and a second disk stem extending from an opposing second side of the first disk to the second port, a first disk guide fixedly positioned within the first port and a second disk guide fixedly positioned within the second port, and a first coupler extending from the first pivotable member towards an exterior edge of the first disk and connecting the first pivotable member to the first disk, wherein the first pivotable member is movable to cause the first disk to move within the first valve chamber into sealing engagement against either of the first port or the second port, and wherein the first disk stem is linearly translatable through the first disk guide and into at least the first strainer inlet when the first disk is moved into sealing engagement against the first port and the second disk stem is linearly translatable through the second disk guide and into at least the second strainer inlet when the first disk is moved into sealing engagement against the second port; and a second seal assembly comprising a second pivotable member, a second disk comprising a third disk stem extending from a first side of the second disk to the third port and a fourth disk stem extending from an opposing second side of the second disk to the fourth port, a third disk guide fixedly positioned within the third port and a fourth disk guide fixedly positioned within the fourth port, and a second coupler extending from the second pivotable member towards an exterior edge of the second disk and connecting the second pivotable member to the second disk, wherein the second pivotable member is movable to cause the second disk to move within the second valve chamber into sealing engagement against either of the third port or the fourth port, wherein the third disk stem is linearly translatable through the third disk guide and into at least the first strainer outlet when the second disk is moved into sealing engagement against the third port, and wherein the fourth disk stem is linearly translatable through the fourth disk guide and into at least the second strainer outlet when the second disk is moved into sealing engagement against the fourth port;

wherein the first disk guide is fixedly positioned at a center of the first port, and a plurality of flow routing vanes extend from the first disk guide to an edge of the first port, wherein the second disk guide is fixedly positioned at a center of the second port, and a plurality of flow routing vanes extend from the second disk guide to an edge of the second port, wherein the third disk guide is fixedly positioned at a center of the third port, and a plurality of flow routing vanes extend from the third disk guide to an edge of the third port, wherein the fourth disk guide is fixedly positioned at a center of the fourth port, and a plurality of flow routing vanes extend from the fourth disk guide to an edge of the fourth port, and wherein the plurality of flow routing vanes each comprise a planar surface with a first end and a second end, the planar surface being oriented so as to be substantially parallel to a flow direction of the fluid, and the first end of each of the flow routing vanes axially extending from a respective disk guide to an edge of a respective port at the second end.

22. The fluid strainer of claim 21, wherein the first coupler comprises a top first coupler and a bottom first coupler, each of the top first coupler and the bottom first coupler extending from the first pivotable member towards the exterior edge of the first disk, and wherein the second coupler comprises a top second coupler and a bottom second coupler, each of the top second coupler and the bottom second coupler extending from the second pivotable member towards the exterior edge of the second disk.

23. The fluid strainer of claim 22, wherein the top first coupler connectably extends from the first pivotable member towards a first pin connected at a top edge of the first disk and the bottom first coupler connectably extends from the first pivotable member towards a second pin connected at a bottom edge of the first disk, and wherein the top second coupler connectably extends from the second pivotable member towards a third pin connected at a top edge of the second disk and the bottom second coupler connectably extends from the second pivotable member towards a fourth pin connected at a bottom edge of the second disk.

* * * * *